United States Patent [19]

Inoue et al.

[11] Patent Number: 5,113,181
[45] Date of Patent: May 12, 1992

[54] DISPLAY APPARATUS

[75] Inventors: Hiroshi Inoue, Yokohama; Atsushi Mizutome, Hayamachi; Hideo Kanno, Kawasaki; Eiji Sakamoto, Hiratsuka; Yoshiyuki Osada, Atsugi, all of Japan

[73] Assignee: Canon Kabushiki Kaisha, Tokyo, Japan

[21] Appl. No.: 306,209

[22] Filed: Feb. 3, 1989

Related U.S. Application Data

[63] Continuation of Ser. No. 18,333, Feb. 24, 1987, abandoned.

[30] Foreign Application Priority Data

Feb. 21, 1986 [JP] Japan .................. 61-035222
Feb. 26, 1986 [JP] Japan .................. 61-041273

[51] Int. Cl.$^5$ ............................................. G09G 3/06
[52] U.S. Cl. .................................... 340/783; 340/784
[58] Field of Search ............... 340/718, 719, 753, 754, 340/758, 759, 752, 765, 783, 784, 798, 802, 825.81; 350/332, 333, 334; 358/241

[56] References Cited

U.S. PATENT DOCUMENTS

| | | | |
|---|---|---|---|
| 3,892,471 | 7/1975 | Biermann et al. | 350/160 |
| 4,112,333 | 9/1978 | Asars et al. | 340/719 |
| 4,345,249 | 8/1982 | Togashi | 340/719 |
| 4,367,924 | 1/1983 | Clark et al. | 350/334 |
| 4,410,887 | 10/1983 | Stolov et al. | 340/765 |
| 4,447,812 | 5/1984 | Soneda et al. | 340/718 |
| 4,586,039 | 4/1986 | Nonomura et al. | 340/784 |
| 4,591,848 | 5/1986 | Morozumi et al. | 340/719 |
| 4,638,310 | 1/1987 | Ayliffe | 340/784 |
| 4,694,287 | 9/1987 | Chenevas-Paule et al. | 340/784 |
| 4,870,399 | 9/1989 | Carlson | 340/719 |
| 4,881,066 | 11/1989 | Kanno et al. | 340/784 |

FOREIGN PATENT DOCUMENTS

| | | |
|---|---|---|
| 3314778 | 11/1983 | Fed. Rep. of Germany . |
| 2507366 | 6/1982 | France . |
| 57118217 | 7/1982 | Japan . |

OTHER PUBLICATIONS

*SID International Symposium Digest of Technical Papers,* New York, May 1985, Sonehara et al., Full-Color TFT-LCD With Phase-Change Guest-Host Mode.

*Primary Examiner*—Alvin E. Oberley
*Assistant Examiner*—Richard Hjerpe
*Attorney, Agent, or Firm*—Fitzpatrick, Cella, Harper & Scinto

[57] ABSTRACT

A display apparatus, comprises a plurality of pixels arranged in pluralities of rows and columns. A plurality of first control lines is provided, each connecting a column of pixels in common, and a plurality of second control lines is provided, each connecting a row of pixels in common. The first control lines are divided into a plurality of blocks. Third control lines are disposed so that the first control lines in each of the blocks are commonly connected by a third control line. A multiplexing switching element is disposed at each connection between the third control lines and the first control lines. Further, a difference in output voltage between two multiplexing switching elements disposed at a boundary between a neighboring pair of blocks is 50 mV or less.

12 Claims, 17 Drawing Sheets

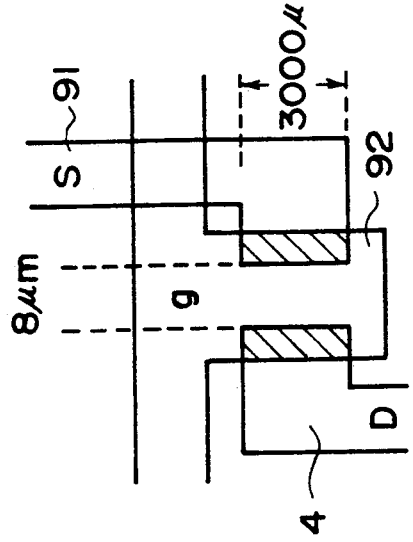
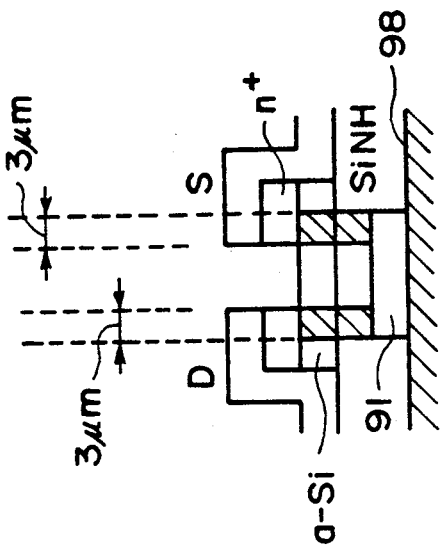
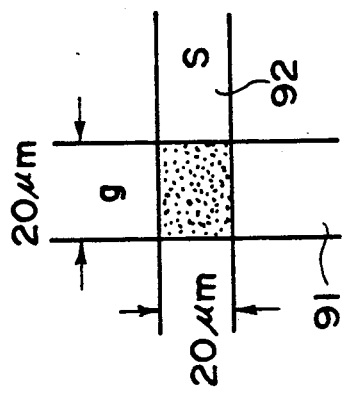
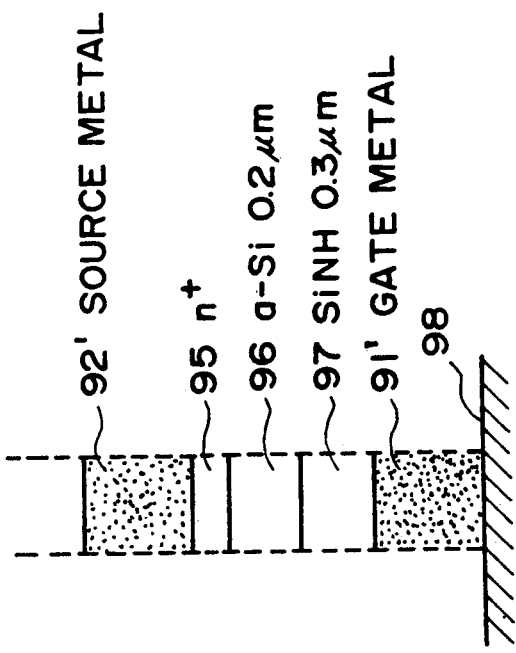

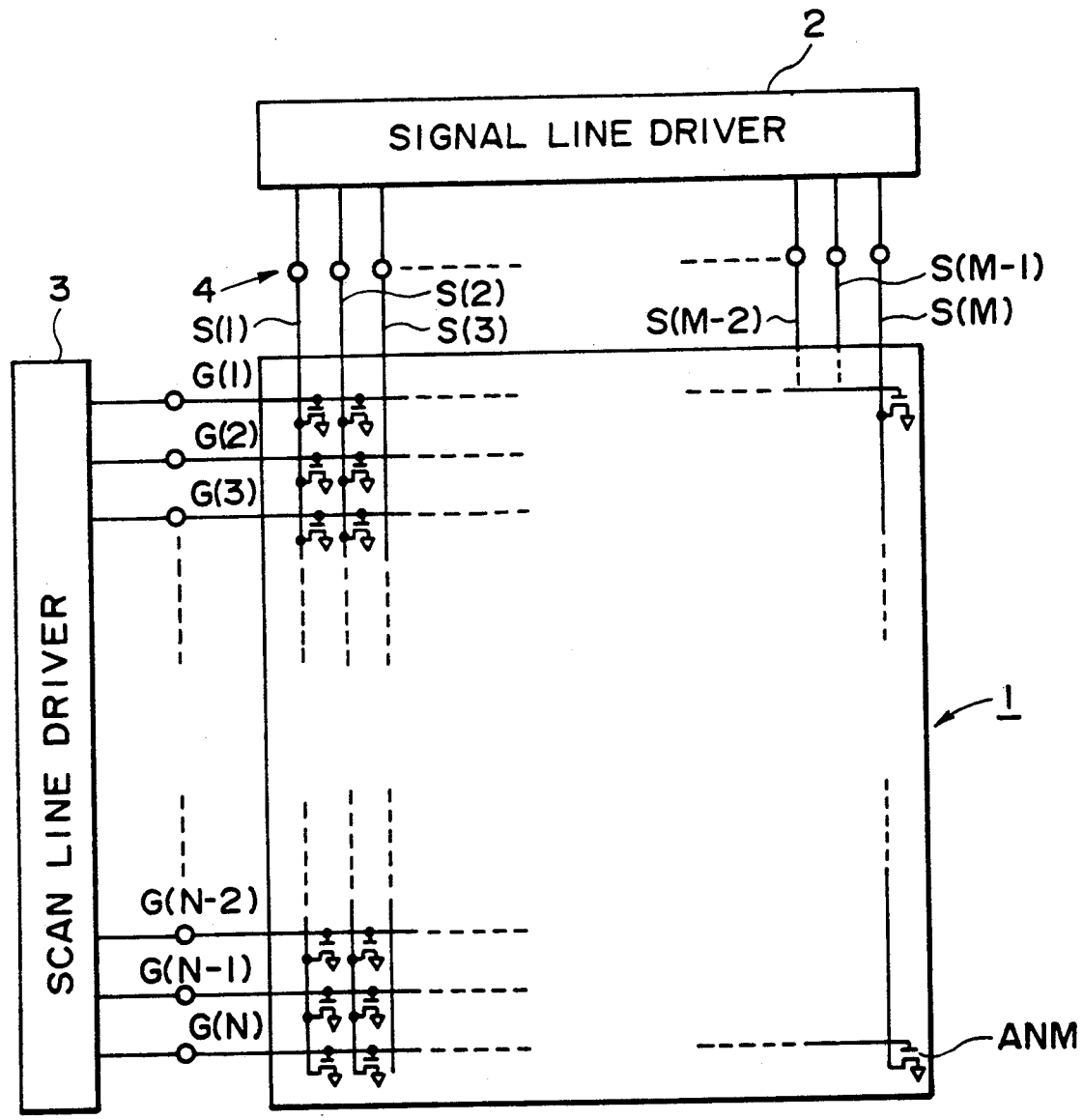
F I G. 18

DISPLAY APPARATUS

This application is a continuation of application Ser. No. 018,333 filed Feb. 24, 1987, now abandoned.

FIELD OF THE INVENTION AND RELATED ART

The present invention relates to a display apparatus, particularly an apparatus using a liquid crystal display panel.

As a representative liquid crystal display apparatus comprising an active matrix circuit substrate, one using TFTs (thin film transistors) as analog switching elements has been used. With respect to this type of liquid crystal display apparatuses, a high density arrangement and a large area display have progressed so that the number of signal lines has increased to nearly 2000. Corresponding thereto, the problems of connection with external circuits and increase in number of driver ICs become serious, whereby there result in lowering in production yield and increase in production cost.

FIG. 18 shows an example of a conventional active matrix type liquid crystal (hereinafter sometimes abbreviated as "LC") display apparatus. Referring to the figure, reference numeral 1 denotes a display unit; ANM, a TFT switching element for driving a pixel; 2, a signal line driver circuit; 3, a scanning line driver circuit; and 4, a connection between the display unit 1 and the signal line driver circuit.

FIG. 19 is a time chart illustrating an image signal which is sampled and held by the signal line driver circuit 2 to be sent to signal lines S(1)–S(M), and scanning signals applied to scanning lines G(1)–G(N). When N scanning lines and M signal lines are arranged to form a matrix, the number of connections 4 becomes M. As for the density, where an LC-full color television panel comprising 480(N) scanning lines, a diagonal picture size of 7 inches and an aspect ratio of 3:4, is considered; the number of signal lines (M) becomes 1920 ($=480\times 3\times 4/3$) and the transverse picture length 1 is given by:

$$1 = 7\times 25.4\ mm \times 4/5 \simeq 142\ mm$$

As a result, the signal line density (d) is given by:

$$d = M/1 = 1920/142 = 13.5\ lines/mm$$

(Incidentally, M is given as the total number of the signal lines for respective colors including red(R), green(G) and blue(B). If it is assumed that one pixel is constituted by R, G and B elements, the picture is composed of a matrix of $N\times M/3$ pixels).

The necessity of connecting such a large number of signal lines in a high density with the external signal line driver circuit 2, several problems have arisen heretofore, such as a lowering in reliability of manufacturing and production yield and an increase in production cost due to an increase in number of external driver ICs. Further, in order to provide the increased number of ICs, a large substrate is required. A problem of imbalance that the external circuit unit occupies a large area compared with the display results.

SUMMARY OF THE INVENTION

The present invention has been accomplished in view of the above problems of the prior art and aims at reducing connections of signal lines for a display panel with an external driver circuit, thereby to achieve simplification of manufacturing, increase in production yield, decrease in manufacturing cost, and further decrease in number of external signal line driver ICs, reduction in scale and size of the external driver circuits, and reduction in cost accompanying the above.

According to the present invention, there is provided a display apparatus, comprising: a first substrate which has, disposed thereon, a plurality of pixel switching elements arranged in plural rows and plural columns, first control lines each connecting a row of switching elements in common, second control lines each connecting a column of switching elements in common, and pixel electrodes each connected to one of the switching elements; a second substrate which has a common electrode disposed opposite to the first substrate; and a liquid crystal disposed between the first substrate and the second substrate;

characterized in that the first control lines are divided into a plurality of blocks; third control lines are disposed so that the first control lines in each of the blocks are commonly connected by a third control line; a multiplexing switching element is disposed at each connection between the third control lines and the first control lines; and a low-resistivity conductor is disposed on the common electrode on the second substrate.

According to a second aspect of the present invention, there is provided a display apparatus, comprising: a plurality of pixels arranged in pluralities of rows and columns, a plurality of first control lines each connecting a column of pixels in common, and a plurality of second control lines each connecting a row of pixels in common;

characterized in that the first control lines are divided into a plurality of blocks; third control lines are disposed so that the first control lines in each of the blocks are commonly connected by a third control line; a multiplexing switching element is disposed at each connection between the third control lines and the first control lines; and a difference in output voltage between two multiplexing switching elements disposed at a boundary between a neighboring ,; pair of blocks is 50 mV or less, preferably 20 mV or less, most preferably 9 mV or less.

The display apparatus may suitably be provided by incorporating therein a signal supplying apparatus comprising a signal line driver circuit and a plurality of signal lines connected to the signal line driver circuit;

characterized in that the signal lines are divided into a plurality of blocks; control lines are disposed so that the signal lines in each block are commonly connected by a control line; a multiplexing switching element is disposed at each connection of the control lines and the signal lines; a ratio between output voltages from any two signal lines is within the range of 1±0.10, preferably 1±0.05; and a ratio between output voltages from two signal lines at a boundary between a neighboring pair of blocks is in the range of 1±0.01, preferably 1±0.003. The output voltages used herein for defining the uniformity of the signal output system are based on a constant arbitrary level of input signal in the operational range supplied from the signal line driver circuit. In order to suppress the difference in output voltages from the signal lines, it is preferred that a lead line for supplying a control signal to a control line for each block is connected to a part of the control line which divides the control line into substantially equal halves each commonly connecting a substantially half (generally in the range of 40-60%) of the multiplexing switching elements for the block.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 10A and 11A are enlarged views of an intersection and a TFT, respectively, and FIGS. 10B and 11B are corresponding sectional views across thickness;

FIG. 18 is a schematic plan view showing an N×M active matrix liquid crystal display apparatus.

DETAILED DESCRIPTION OF PREFERRED EMBODIMENTS

Figure 1:
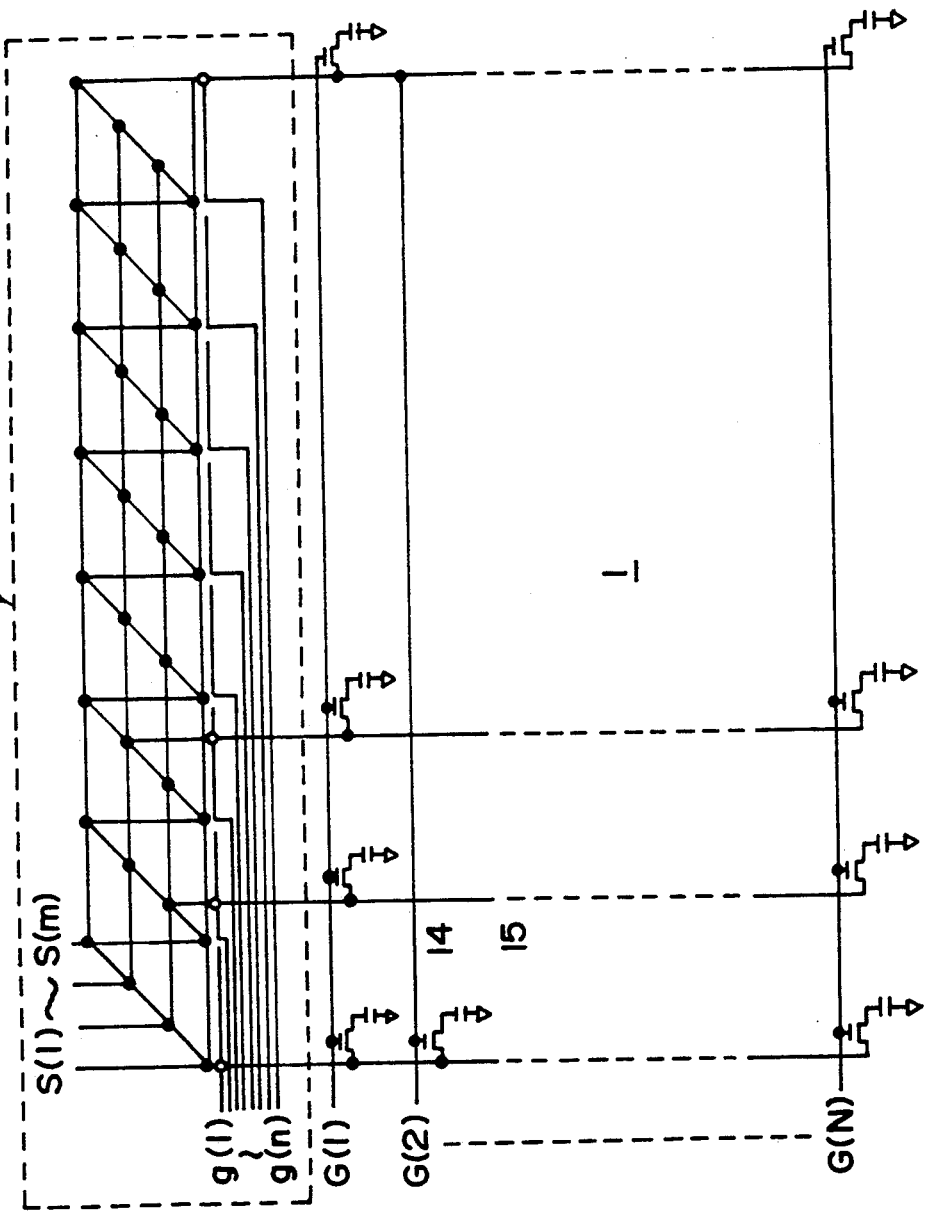
FIG. 1 is a schematic plan view of an embodiment of an active matrix type liquid crystal display apparatus (N×M pixels) according to the present invention.
Figure 2:
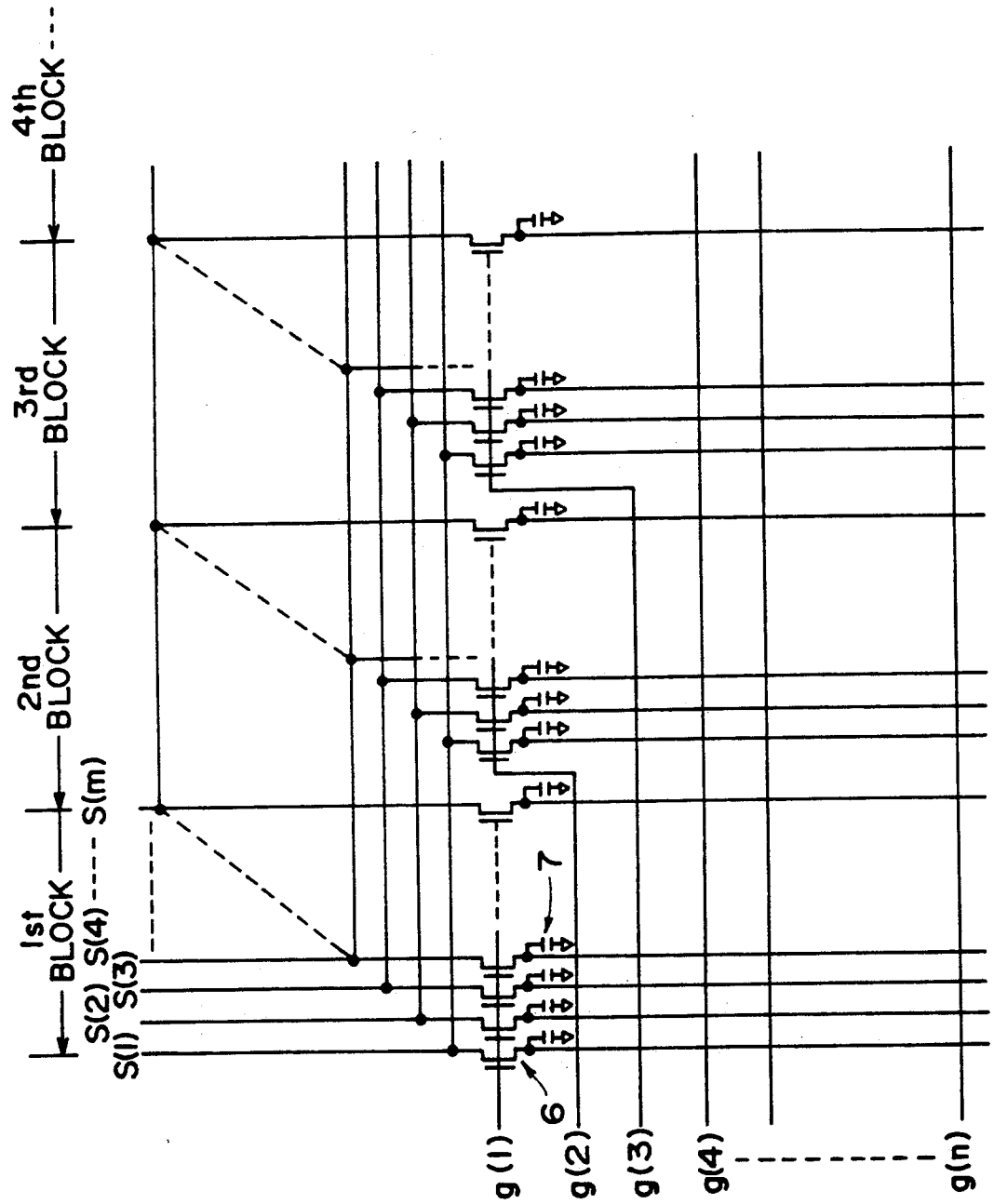
FIG. 2 is a partially enlarged view of an n×m matrix wiring circuit connected to M signal lines (m<M) for the N×M active matrix.
Figure 3:
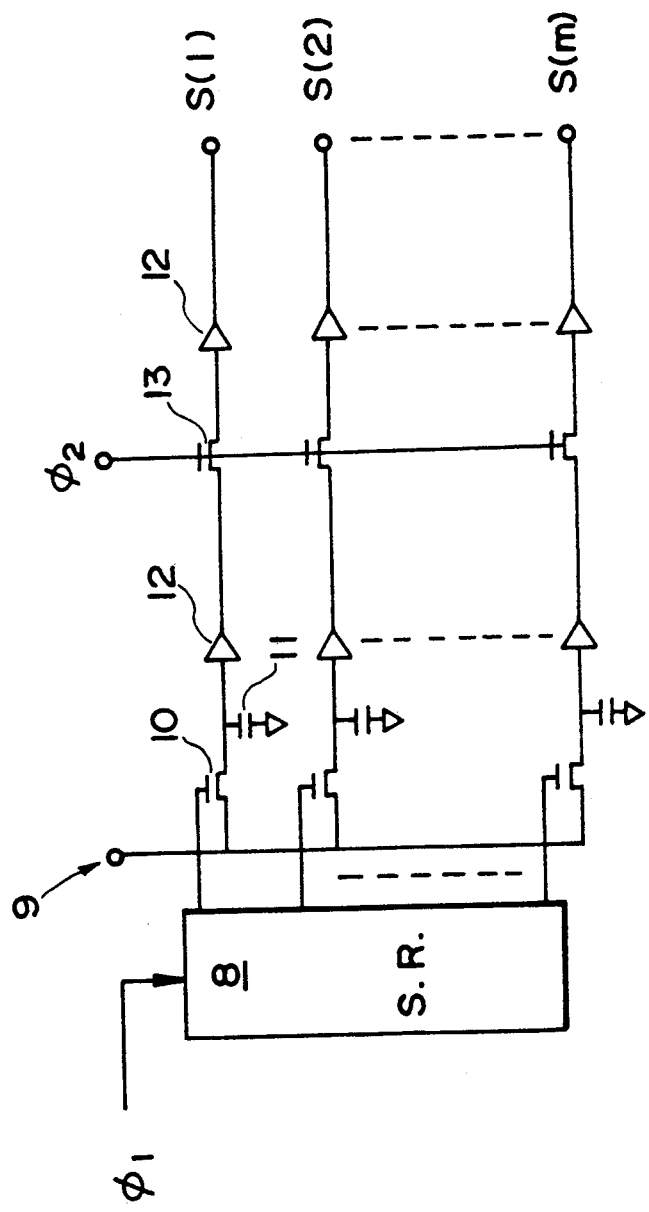
FIG. 3 is an image signal output circuit diagram for supplying image signals to m signal lines in a multiplexing matrix according to the present invention.
Figure 4:
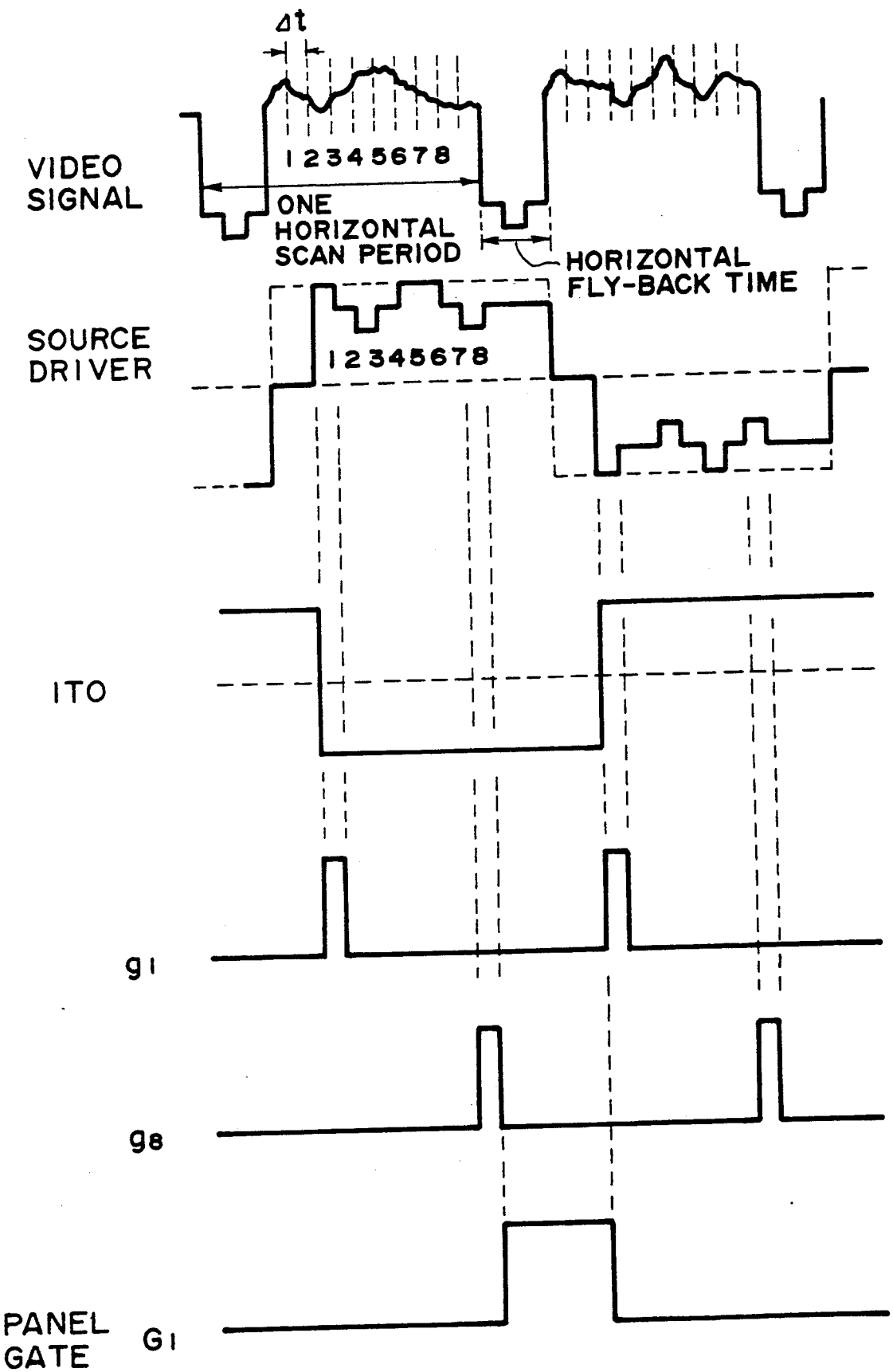
FIG. 4 is a time chart of image signals, switching signals to signal lines and M switching elements according to the present invention and a pixel scanning signal.

FIG. 1 shows an embodiment of the present invention, which comprises an N×M active matrix liquid crystal display unit comprising N×M pixels each provided with a switching element (which may be a TFT or a non-linear element such as an MIM (metalinsulator-metal)) as shown in FIG. 18, and also an additional n×m active matrix circuit 5 disposed on the same substrate as the N×M active matrix display unit and encircled with a dashed line in the figure. FIG. 2 illustrates the internal arrangement of the n×m active matrix circuit which comprises analog or multiplexing switching transistors (hereinafter sometimes abbreviated as "AS transistor(s)") 6 for image or video signals; image signal sample-and-hold capacitors 7 each following one of the AS transistors 6; image signal lines S(1)-S(m) for supplying latched image signals to the AS transistors 6; and switching or gate line g(1)-g(n) for switching the AS transistors 6. More specifically, the matrix circuit shown in FIG. 2 is constituted by dividing M signal lines for constituting the N×M display matrix shown in FIG. 18 into n blocks each having m lines (n and m are integers satisfying n≧M/m). Thus n lines gathered by selecting one from each of the n groups are commonly connected to one of the signal lines S(1)-S(m) through corresponding AS transistors 6 so that they are selectively supplied with an image signal from one of the signal lines S(1)-S(m) through a transistor 6, which is to be stored in a corresponding capacitor 7. In this way, the n×m matrix circuit shown in FIG. 2 is constituted by m image signal lines S(1)-S(m), n switching signal lines g(1)-g(n), and n×m AS transistors 6 and capacitors 7. Now, when image signals are treated with an image signal latch circuit or source driver shown in FIG. 3 and supplied to the signal line S(1)-S(m) shown in FIG. 2, time relations as shown in FIG. 4 among the image signals, the signals at AS transistors (source drivers) 6, the voltage level of the counter electrode (ITO (indium-tin-oxide)), switching signals $g_1$, $g_2$, and a scanning signal for a display transistor (represented by $G_1$ as shown in FIG. 1) may be obtained. More specifically, with reference to FIG. 3, input analog image signals 9 are supplied under the control of pulses supplied from a shift resistor 8 at time $\phi_1$, sequentially sampled by transistors 10, held by capacitors 11 and amplified by amplifiers (source follow buffers) 12. The thus A/D-converted image signals are latched by transistors 13 at the same time $\phi_2$ and supplied to the signal lines S(1)-S(m) shown in FIG. 1 or 2. The points of time for the latching with respect to the respective switching signal lines g(1)-g(n) or with respect to respective outputs to the signal lines S(1)-S(m) are denoted by $t_1, t_2, \ldots t_n$ (n=8 in FIG. 4), which correspond to phases 1, 2, ... 8 of the video signal shown in FIG. 4. The AS transistors 6 controlled by g(1)-g(n) are respectively turned on for $\Delta t = t_2 - t_1 = t_3 - t_2 = \ldots$ and supply the image signals from the latch circuit shown in FIG. 3 to the corresponding capacitors 7 at each time of $\Delta t$.

Then, after the image signals for the final block are held in the corresponding capacitors 7 by turning on the corresponding transistors 6 through the switching signal line g(n) at the time $t_n$, a switching signal line for transistors in the display unit 1 shown in FIG. 1, i.e., one of the pixel scanning lines G(1)-G(N), is turned on to supply the A/D-converted image signals to the pixels on the scanning line in a period of $t_G$ including a horizontal fly-back time for image signals and before the subsequent latch time for a first block of signal lines S(1)-S(n) with respect to the subsequent scanning line.

By repeating the above operation for a number of times equal to the number of scanning lines, image data for one picture is transferred to the respective pixels to provide a display of one picture.

Now, a case where television signals according to the NTSC system are displayed on a panel having a pixel matrix of N=480 and M=1920 with a frame frequency of 60 Hz by using an n×m signal distribution of m=240 and n=8, is considered. In this case, one horizontal scanning period is 63.5 μsec and one horizontal fly-back time is 11.5 μsec, so that the time Δt for driving one block of signal lines S(1)-S(m) is given by:

$$\Delta t \leq (63.5 - 11.5)/9 = 5.78 \ \mu\text{sec (one } \Delta t \text{ is additionally taken as a time for A/D conversion)},$$

and the time $t_G$ which is the maximum time available for supplying image data to the pixels on one scanning line is given by:

$$t_G \leq 63.5 - 5.8 \times 8 = 17.1 \ \mu\text{sec}.$$

In this regard, it is to be noted that the time Δt of 5.8 μsec for the final block operation time $t_n$ may also be used as a part of $t_G$. More specifically, the synchronizing the time $t_n$ for turning-on the last switching line g(n) and the time for turning on an arbitrary scanning line, e.g. G(i) (=i-th scanning line), actually has a meaning that the image signals sampled-and-held by a circuit shown in FIG. 3 are sent directly to the pixels through AS transistors 6, and thus can be effected without problem. By doing so, the charging time for pixel switching transistors can be extended to decrease the load of the transistors, so that small-capacity transistors will be sufficient.

Figure 5:
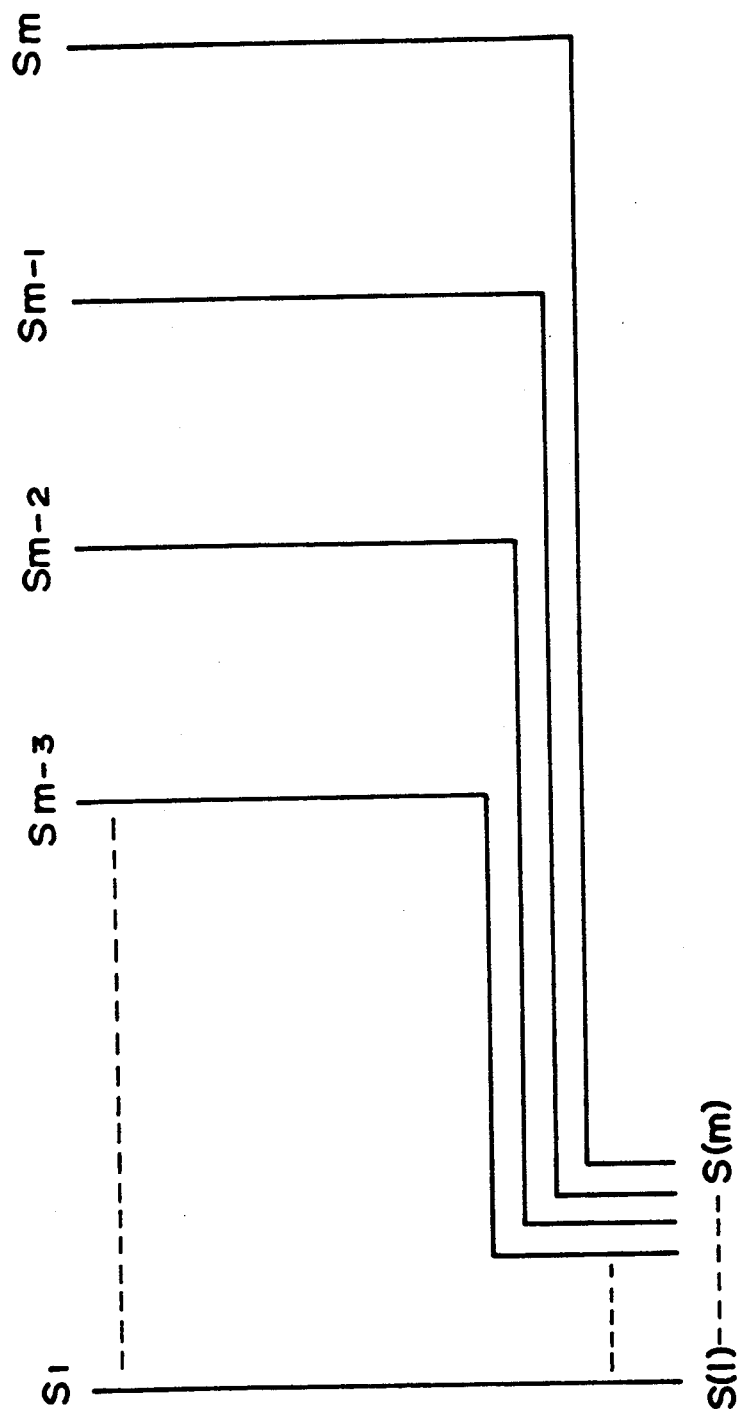
FIG. 5 illustrates a signal line arrangement with a lower density according to the present invention.
Figure 6:
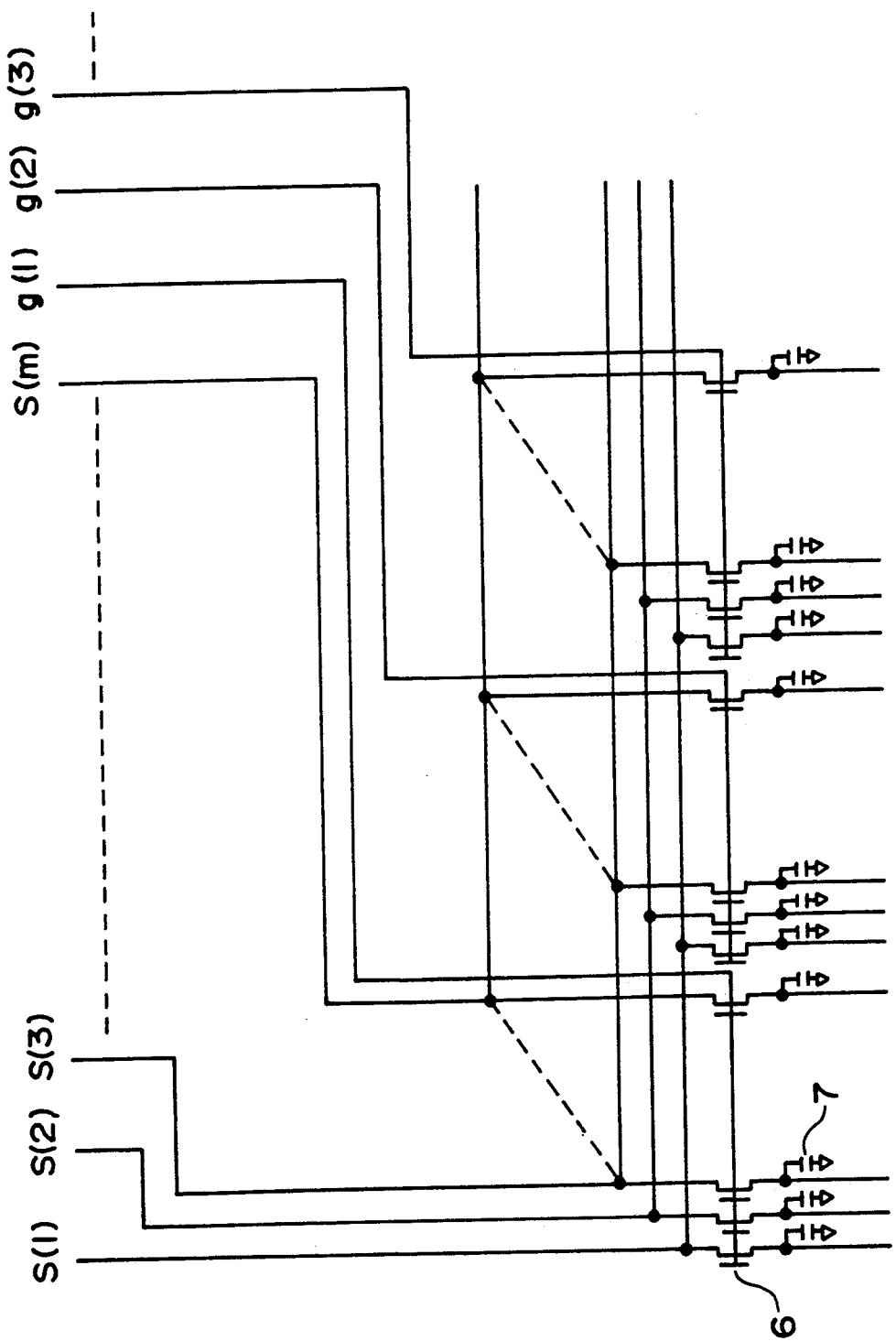
FIG. 6 illustrates a signal line arrangement with a low density according to another embodiment of the present invention.

In this case, the number of connections between the external signal processing circuit shown in FIG. 3 and the signal lines S(1)-S(m) shown in FIG. 1 or FIG. 2 is equal to m (=240), so that the signal line density can be lowered to d=m/l=240/142=1.69 lines/mm. FIG. 5 shows an example of low-density layout of signal lines S(1)-S(m). FIG. 6 shows another example of low density arrangement of S(1)-S(m) in combination with g(1)-g(n). In this case, the signal line density is increased to d=(240+8)/142=1.75 lines/mm, but the increase is so slight that the effect of decreasing the number of connections is hardly affected thereby, and on the other hand, there can be attained an advantage that the required performances of the amplifiers 12 in the external signal processing unit shown in FIG. 3 are made uniform. More specifically, in the arrangement shown in FIG. 6, the wiring capacitance provided by overlapping or intersection of the lines g(1)-g(n) and the lines S(1)-S(m) on the matrix circuit substrate is made uniform, so that data fluctuation against the outputs from the external circuit shown in FIG. 3 is made uniform and designing for suppressing image fluctuation becomes easier.

Incidentally, the AS transistors 6 for block division can have basically the same structure as the pixel switching transistors, and the data holding capacitors 7 may be produced by using a known technique in parallel with the production of the transistors or can be omitted by using wiring capacitances etc., so that it would be apparent that the n×m active matrix circuit 5 for block division may be formed on the same substrate as the display unit 1.

In the display apparatus according to the present invention, as shown in FIG. 4, video signals are transformed by a source driver as shown in FIG. 3 into digital signals which are polarity-inverted in each horizontal scanning period, and the digital signals are supplied to the signal lines S(1)-S(m) in the n×m active matrix circuit 5. In this instance, according to FIG. 4, after the gates of pixel switching transistors on a scanning line (e.g., G₁) is turned off, the polarity of the common electrode (ITO) is inverted and then the gates of the first block AS transistors are turned on (g₁) followed by the operation of subsequent blocks, so that the magnitude of actual delay in polarity inversion of the common electrode determines the durations of the gate-on pulses of the AS transistors 6 in the n×m active matrix circuit 5 and the gate-on pulses of the pixel switching transistors 14, and accordingly the charge efficiency of the pixel switching transistors, which in turn determines the magnitude of effective voltage applied to the liquid crystal and the electrooptical characteristics of the display unit 1. This means that the delay in polarity inversion of the common electrode should be minimized so that enough time is left as the durations of the gate-on pulses for the AS transistors 6 and the pixel switching transistors 14 in the period of $t_G$(=17.1 μsec) as described above. More specifically, if a duration Δt of 5.8 μsec is secured for an AS transistor 6 and a duration of 15.5 to 16.5 μsec is secured for the gate-on pulse of a pixel switching transistor 14 so as to allow the use of a small pixel TFT, the delay in polarity-inversion of the control electrode should be suppressed to only 0.5–1.5 μsec.

In the display apparatus according to the present invention, the delay in polarity inversion of the common electrode may be suppressed to 1.5 μsec or less by disposing a low-resistivity conductor of a metal such as silver, aluminum, chromium, gold or an alloy of such a metal which preferably provides a sheet resistivity on the order of 0.4 Ω/□(ohms per unit area) or below which is lower than a sheet resistivity on the order (ohms per unit area) of 100 Ω/□ of a uniform ITO film forming a common electrode. Herein, the sheet resistivity may be measured according to ASTM D-257 (American Society for Testing and Materials).

The low-resistivity conductor may be disposed in the form of a frame surrounding a uniformly disposed transparent common electrode of, e.g., ITO, or stripes or mesh (cross stripes) formed on a uniformly disposed common electrode so as to extend to face either one or both of the scanning electrodes and the signal electrodes on the active matrix circuit substrate. It is further preferred that the low-resistivity conductor is disposed in the form of a combination of the frame with the stripe or further preferably with the mesh conductor. In the case of a frame conductor, it is possible to dispose terminals of the common electrode at at least two of the four corners of the frame. The stripe or mesh (cross stripe) conductor is formed, e.g., in a thickness of 500–1500 Å and a width of 1–50μ so as to leave a transparent display area at a rate of 60% or more. The stripe or mesh conductor may also be formed in alignment with the arrangement of the switching elements formed on the active matrix circuit so as to interrupt incident light from entering a thin film semiconductor constituting a TFT as a switching element.

In the present invention, it is also possible to provide a conductive color filter used for color display on a common electrode or to dispose a metal stripe mask used for color display on a common electrode to decrease the delay in signal polarity inversion due to the common electrode.

The present invention further provides an improved arrangement of switching or gate lines (g(1)-g(n)) in the above mentioned n×m active matrix, i.e., a multiplexing TFT matrix for block division of signal lines. More specifically, depending on the arrangement of the gate lines, different degrees of delay of gate pulses applied to the respective TFTs arise which lead to a difference or lowering in luminance on a picture. The delay comprises principally the following two types depending on the causes:

a) A delay caused by capacitances ($C_{cross}$) occurring at the intersections of the source lines $S_1$, $S_2$, ... and the gate lines $g_1$, $g_1$, ..., and the wiring resistance ($R_g$).

b) A delay caused by channel parasitic capacitances ($C_{gs}$ and $C_{gd}$) and channel capacitance ($C_{channel}$) of TFTs.

Figure 12:
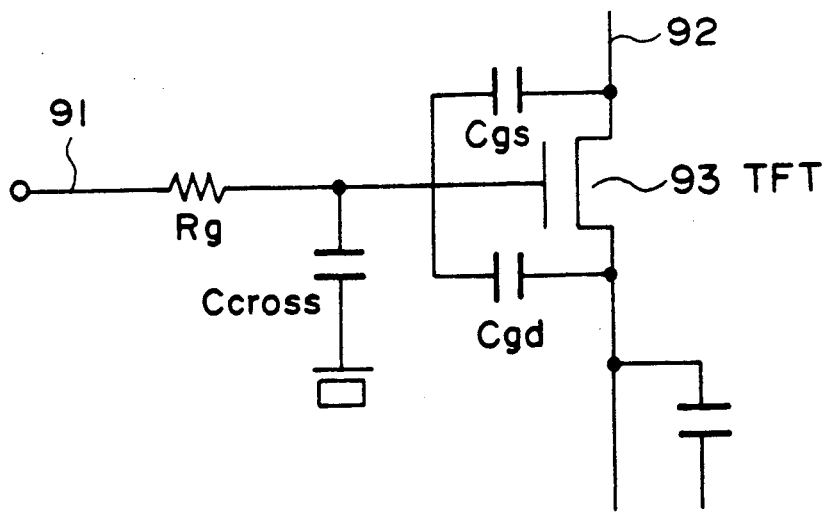
FIG. 12 is an equivalent circuit diagram illustrating a gate pulse delay.
Figure 16:
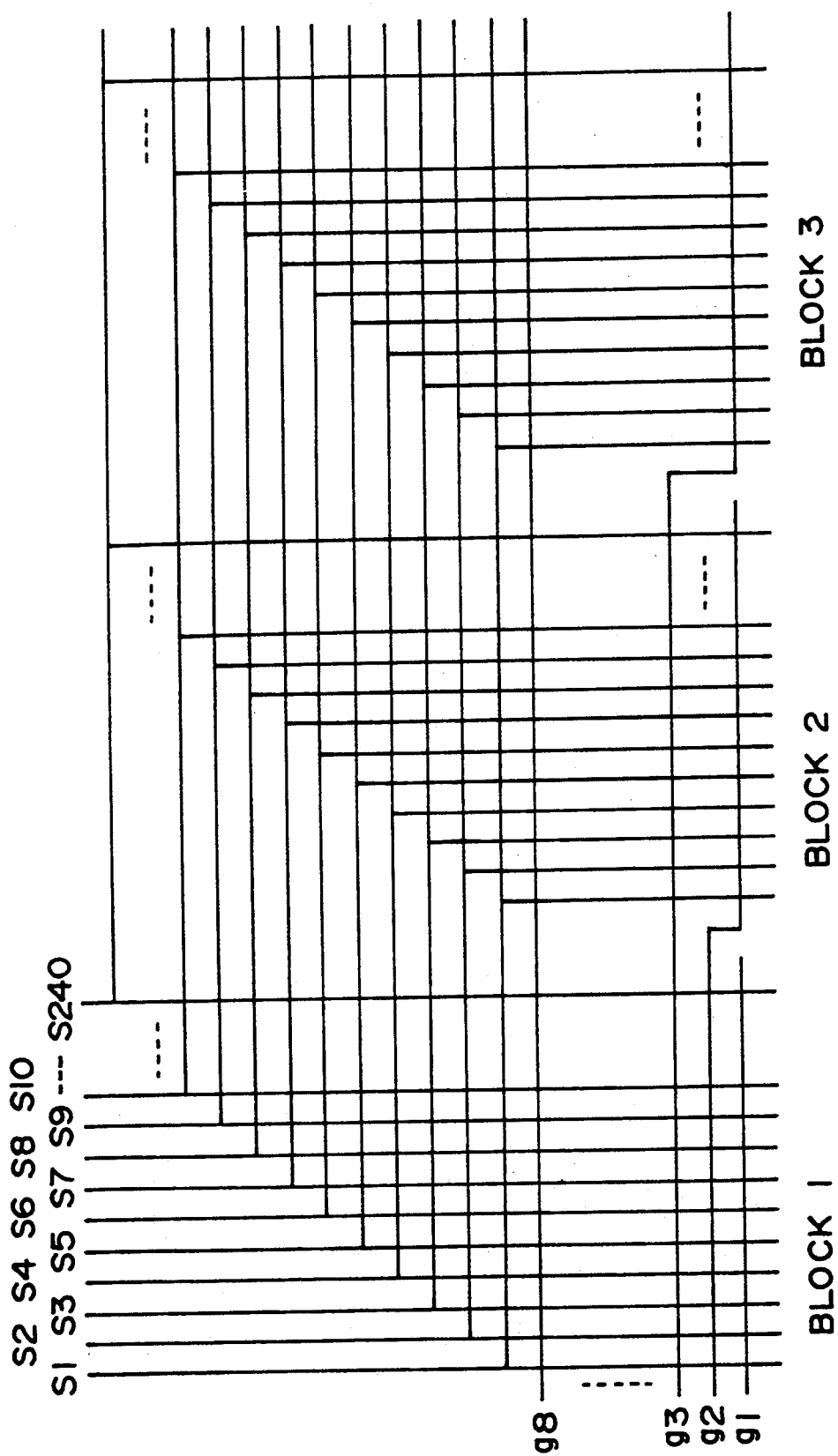
FIGS. 16 and 17 are enlarged partial views of FIG. 1.
Figure 17:
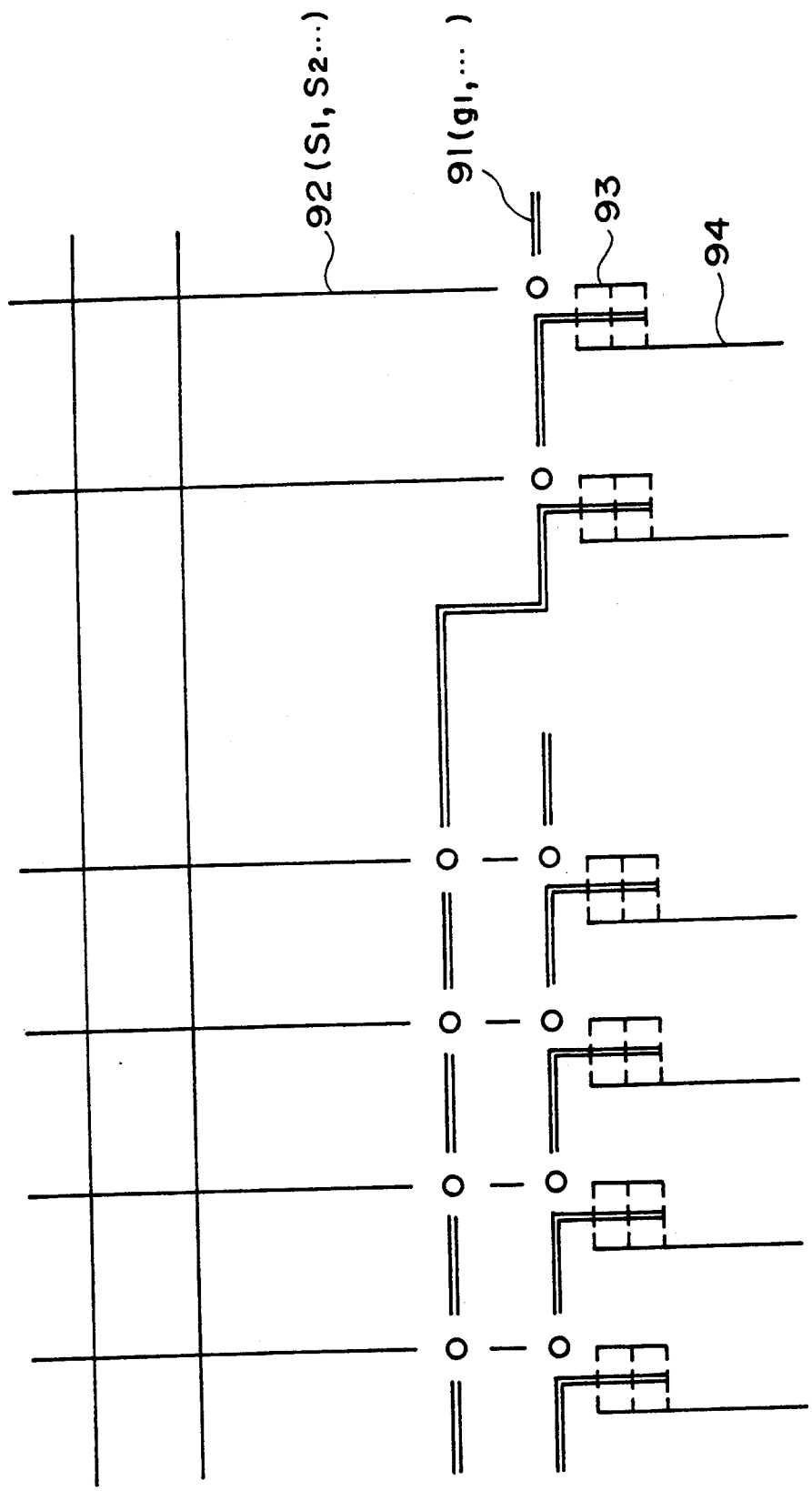
Figure 19:
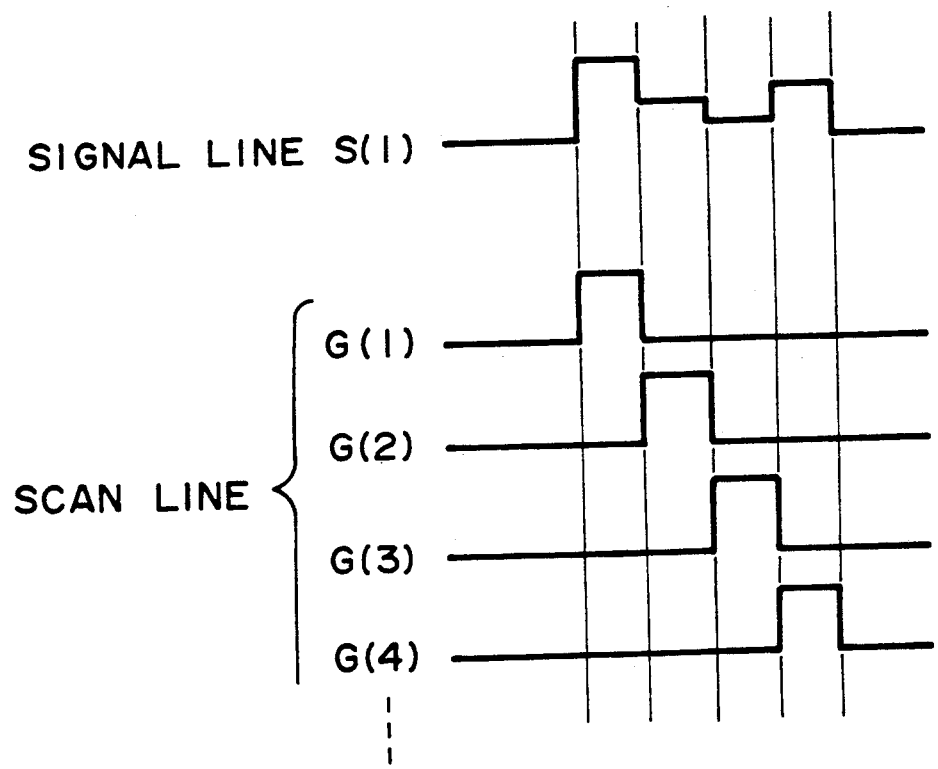
FIG. 19 is a time chart showing a time-serial relationship of image signals and scanning signals.

The delay is represented by an equivalent circuit shown in FIG. 12, and will be explained in more detail based on an embodiment. FIG. 16 is an enlarged partial view of the n×m active matrix circuit unit 5 shown in FIG. 1, and FIG. 17 is a further enlarged view. Referring to the figures, among the intersections (some are denoted by ○ in FIG. 17) of the gate lines ($g_1$-$g_8$) and the source lines ($S_1$-$S_{240}$), at each of the intersections on the lowermost row, a TFT 93 is formed. From each TFT 93, an output line (signal line) 94 is led out extending to pixel switching elements (14 in FIG. 1).

FIG. 10A is an enlarged view of the above mentioned intersection not provided with a TFT, and FIG. 10B is a sectional view across the thickness. FIG. 11A is an enlarged view of a TFT 93, and FIG. 11B is a sectional view across the thickness.

Referring to FIGS. 10A and 10B, the gate line 91 has a width of 20 μm and the source line 92 has a width of 20 μm. Between these metal layers, an ohmic resistance layer 95 of n+-a-Si (a-Si denotes amorphous silicon), a semiconductor layer 96 of a-Si, and an insulating layer of SiNH are disposed. When it is assumed that the semiconductor layer 96 has a thickness $d_i=0.2$ μm and a dielectric constant $\epsilon_i=12$, and the insulating layer 97 has a thickness $d_{SiNH}=0.3$ μm and a dielectric constant $\epsilon_{SiNH}=6.6$, the capacitance $C_{cross}$ for an intersection is calculated to be $5.7 \times 10^{-14}$ F from the following equation (1):

$$C_{cross} = \epsilon_0 S \frac{\epsilon_i/d_i \cdot \epsilon_{SiNH}/d_{SiNH}}{\epsilon_i/d_i + \epsilon_{SiNH}/d_{SiNH}} \quad (1)$$

wherein S is the area of an intersection (=20 μm×20 μm) and $\epsilon_0$ is the dielectric constant of vacuum (8.85×10$^{-4}$).

As for the parasitic capacitances $C_{gs}$ and $C_{gd}$ of a TFT 93 which are to be considered when it is turned off, the laminar structures of these parts are the same as that of the intersection shown in FIG. 10B and only the area is different, so that $$C_{gs} = C_{gd} = \{C_{cross}/(20\mu \times 20\mu)\} \times 3\mu \times 3000\mu = 1.28 \, pF \quad (2)$$

The channel capacitance $C_{channel}$ which is to be considered when a TFT is turned on, can be calculated by assuming that the semiconductor layer is regarded as a conductor as follows:

$$C_{channel} = \epsilon_0 \times (6\mu + 8\mu) \times 3000\mu \times \epsilon_{SiNH}/d_{SiNH} \quad (3)$$
$$= 8.18 \, pF$$

As for the gate line resistance Rg in the matrix, a gate line composed of a laminate of 0.1 μm-thick Al on 0.1 μm-thick Cr has a resistance similar to that of the Al layer alone as Al has a larger conductivity than Cr by two figures, so that the gate line with a 20 μm-width has a resistance per unit length of about 200 Ω/cm.

Based on the above data, the total values for the matrix arrangement shown in FIG. 16 for a 7-inch panel, wherein 1920 signals lines are divided into 8 blocks each including 240 source lines, 240 TFTs, and a gate line length of 1.68 cm, may be calculated as follows for the last TFT (i.e., the rightmost TFT in FIG. 16) in an i-th block (i=1 to 8):

$$(\Sigma C_{cross})_i = 5.7 \times 10^{-14} \, F \times 240 \times i = 13.5 \times i \, pF;$$

-continued $$(\Sigma TFT)_{off} = (\Sigma C_{gs} + C_{gd}) = 2.56 \, pF \times 240$$
$$= 615 \, pF;$$

$$(\Sigma TFT)_{on} = (\Sigma C_{channel}) = 8.18 \, pF \times 240$$
$$= 1963 \, pF;$$

$$(\Sigma R)_i = 200 \times 1.63 \times i = 366 \times i \, ohm.$$

As a result, the time constants for gate pulse delay when a TFT is turned off ($\tau_{off}$) and turned on ($\tau_{on}$) are as follows with respect to the last TFT in an i-th block:

$$\tau_{off} = (\Sigma C_{cross} + (\Sigma TFT)_{off})_i \times (\Sigma R)_i$$
$$= 0.207 \times i(\mu sec) + 4.60 \times i^2(nsec).$$

$$\tau_{on} = (\Sigma C_{cross} + (\Sigma TFT)_{on})_i \times (\Sigma R)_i$$
$$= 0.659 \times i(\mu sec) + 4.60 \times i^2(nsec).$$

As a result, with respect to the first four blocks, the results shown in the following Table 1 are obtained.

TABLE 1

| | Delay time constant for the rightmost TFT | | | |
|---|---|---|---|---|
| | Block 1 | Block 2 | Block 3 | Block 4 |
| $\tau_{off}$ | 0.21 μsec | 0.43 μsec | 0.66 μsec | 0.90 μsec |
| $\tau_{on}$ | 0.66 | 1.34 | 2.02 | 2.71 |

Figure 13:
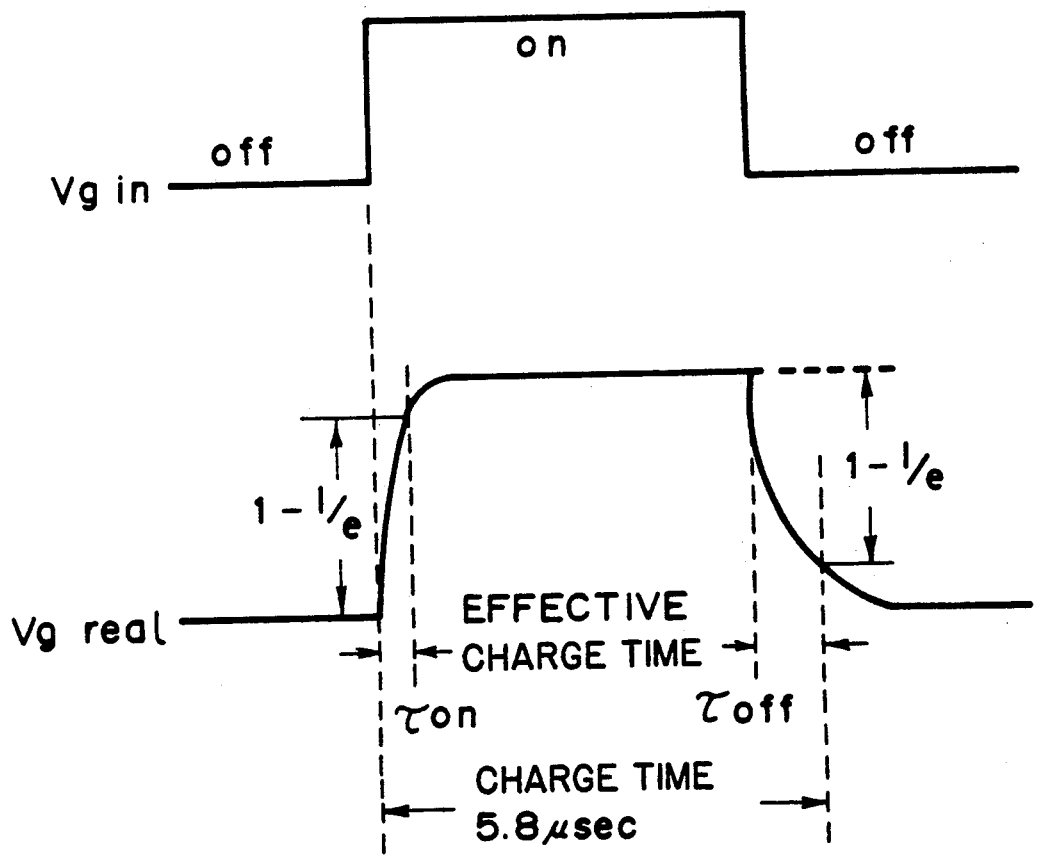
FIG. 13 is a time chart showing a relation between an applied voltage and a charge time.

Now, in a case where a charging time allotted to a multiplexing TFT matrix is 5.8 μsec as described above, the effective charge time is decreased by $\tau_{off}$ on $\tau_{on}$ as follows;

Effective charge time=$5.8 \, \mu sec - \tau_{off} - \tau_{on}$. This is shown in FIG. 13.

As the effective charge efficiency $\eta_{eff}$ for the above system can be calculated by:

$$\eta_{eff} = 1 - 0.4 \exp(-1.5 \times 10^6 \cdot t),$$

the changes in effective charge efficiency and output voltage due to decrease in effective charge time are calculated and shown in the following Table 2.

TABLE 2

| | Charge efficiency for the rightmost TFT | | | |
|---|---|---|---|---|
| | Block 1 | Block 2 | Block 3 | Block 4 |
| Charge efficiency | 99.605% | 98.875% | 96.745% | 90.223% |
| Output voltage | 5.9763 V | 5.9325 V | 5.8047 V | 5.4134 V |

L/W = 8/3000, μ = 0.3, c = 17 pF, Vg = 20 V, $V_{th}$ = 5 V, $V_S$ = 6 V, $V_s$(t = 0) = −6 V, $d_{ins}$ = 0.3 μm, $\epsilon_{ins}$ = 6.6.

The above Table 2 shows that, in the gate line arrangement shown in FIG. 16, the gate pulse delay increases as it goes to a block to the right and the decrease in output voltage becomes very substantial already in the fourth block.

Figure 8:
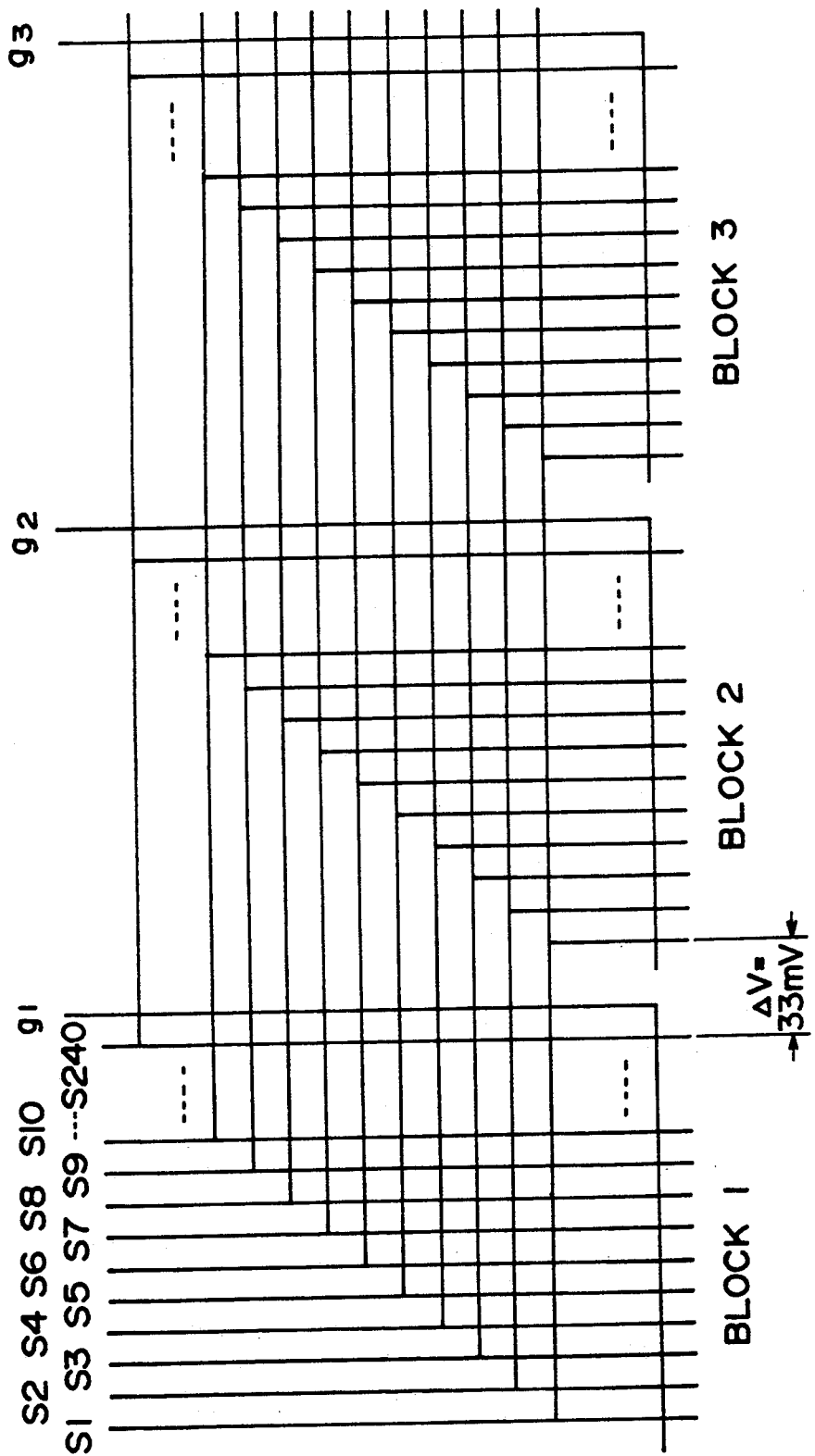
FIGS. 8 and 9 are enlarged partial views of FIG. 6.
Figure 9:
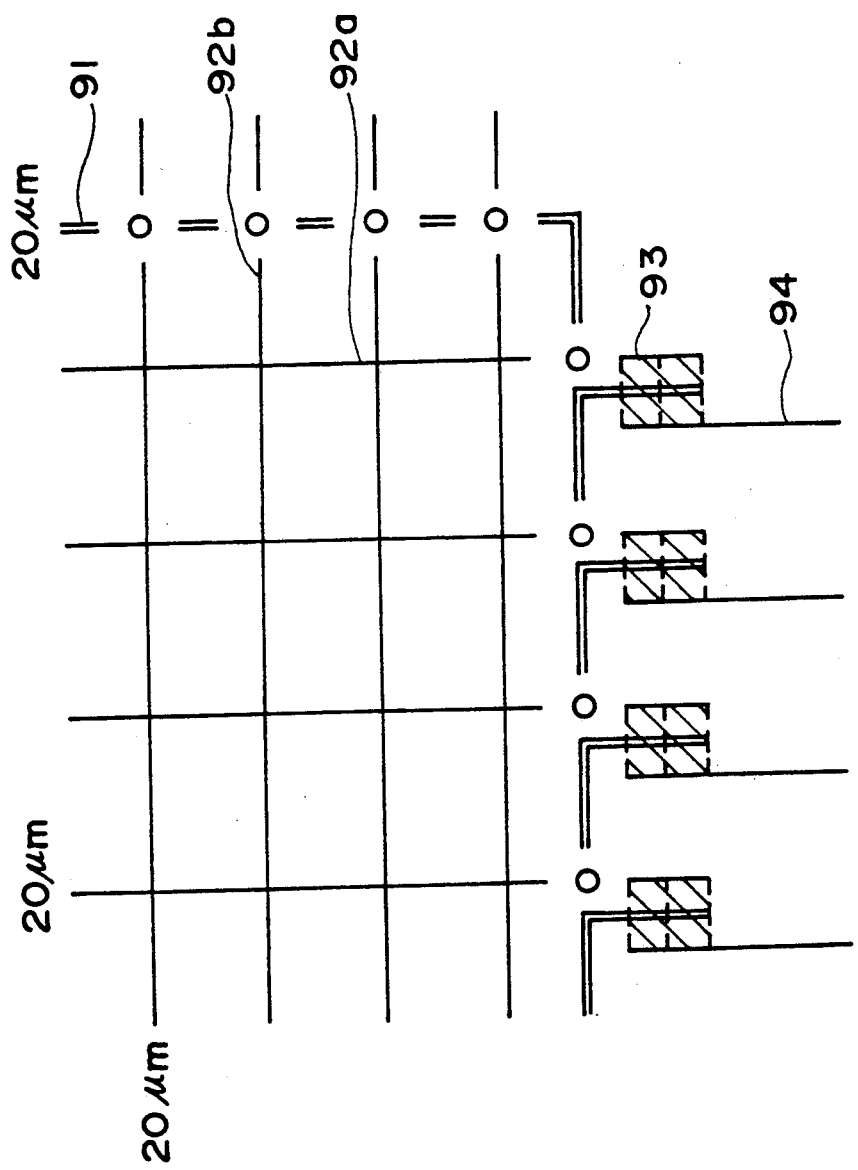

FIG. 6 show a gate line arrangement which has been improved in the above problem. An enlarged partial view of FIG. 6 corresponds to FIG. 11 is shown in FIG. 8.

In this case, the output voltage change between the blocks has been essentially removed but the output voltage change between TFTs at both ends in an individual block cannot be neglected. In the case of FIG. 6, the respective factors concerning the gate pulse delay are calculated with respect to the last TFT (leftmost one in FIG. 6) in each block as follows corresponding to the embodiment of FIG. 16:

$$\Sigma C_{cross} = 5.7 \times 10^{-14} \times 240 \times 2 = 27.4 \ pF$$

$$(\Sigma TFT)_{off} = 2.56 \ pF \times 240 = 615 \ pF$$

$$(\Sigma TFT)_{on} = 8.18 \ pF \times 240 = 1963 \ pF$$

$$\Sigma R = 200 \times 1.68 \times 1.6 = 538 \ \Omega,$$

wherein the coefficient 1.6 is a shape factor indicating the increase in gate line length with respect to the vertical portion in the embodiment of FIG. 6 compared with that of FIG. 16. The above values do not change depending on the number of a block concerned. Correspondingly, the delay time constants for the leftmost TFT are as follows:

$$\tau_{off} = 0.35 \ \mu sec. \ \tau_{on} = 1.07 \ \mu sec.$$

These cause a decrease in effective charge time from 5.8 $\mu$sec to 4.38 $\mu$sec ($=5.8-0.35-1.07$), providing a charge efficiency of 99.3% (5.958 V).

On the other hand, the rightmost TFT in a block in FIG. 6 involves capacitances at 240 intersections and a resistance in the gate line-source line matrix area and its own $C_{gs}$, $C_{gd}$ and $C_{channel}$, so that the factors concerning the delay are as follows;

$$\Sigma C_{cross} = 5.7 \times 10^{-14} \times 240 = 13.7 \ pF$$

$$R = 200 \times 1.68 \times 0.6 = 202 \ \Omega,$$

$$\Sigma TFT_{off} = 1.28 \times 2 = 2.56 \ pF$$

$$\Sigma TFT_{on} = 8.18 \ pF.$$

Thus, $\tau_{off} = 3.28 \times 10^{-3}$ $\mu$sec, $\tau_{on} = 4.42 \times 10^{-3}$ $\mu$sec. The effective charge time in this case is 5.79 $\mu$sec ($=5.8-3.28\times10^{-3}-4.42\times10^{-3}$), the charge efficiency is 99.85% (5.991 V).

From the above results, there occurs a gain difference of 0.55% (33 mV in output voltage). This means that the arrangement in FIG. 6 provides a voltage difference of 33 mV between the two TFTs below a neighboring pair of blocks as shown in FIG. 8. The above difference in output voltage of 33 mV might appear to be small. However, human eyes are sensitive to a difference in luminance at a boundary between neighboring areas (a differential luminance difference) and can recognize a difference of more than 3%, particularly more than 5%, in transmittance as a luminance difference at a boundary, which impairs picture quality. Experimental results show that a voltage change exceeding 0.3% of a driving voltage can cause a difference in transmittance of 3-5% or more, and in the above embodiment uses a gradation amplitude of $\pm 3$ V for video signals, so that the tolerable voltage change is limited to $3.0 \times 0.3\% = 9$ mV. As a result, the above difference of 33 mV at the boundary is not tolerable. This leads to a substantial loss of advantages accompanying the simplification of an external circuit for signal lines and decrease in the number of communications. Moreover, the above difference in output voltage increases as the number of TFTs and source lines included in a block increases corresponding to a desire of increasing the size and fineness of a picture.

The present invention provides a display apparatus using a multiplexing active matrix for block division of signal lines capable of providing a good quality of display by solving the above problems without introducing technical difficulty in pattern designing and production process. The present invention also provides a signal supplying or output apparatus suitable for use in such a display apparatus and other apparatus using a multiplicity of parallel signals.

In a preferred embodiment according to the present invention, in substantially the same arrangement of active matrix shown in FIG. 6, a gate line is led in substantially the middle of the matrix and branched into mutually opposite directions so as to form a letter of "reverse T" and connect TFTs almost equally distributed to the left and right. As a result, the gate pulse delay assumes a minimum at the center TFT and a maximum at TFTs at both ends in a block, but the maximum delay occurs equally at two TFTs at a boundary of two neighboring blocks, so that no difference in charge efficiency or luminance occurs at the boundary.

Figure 7:
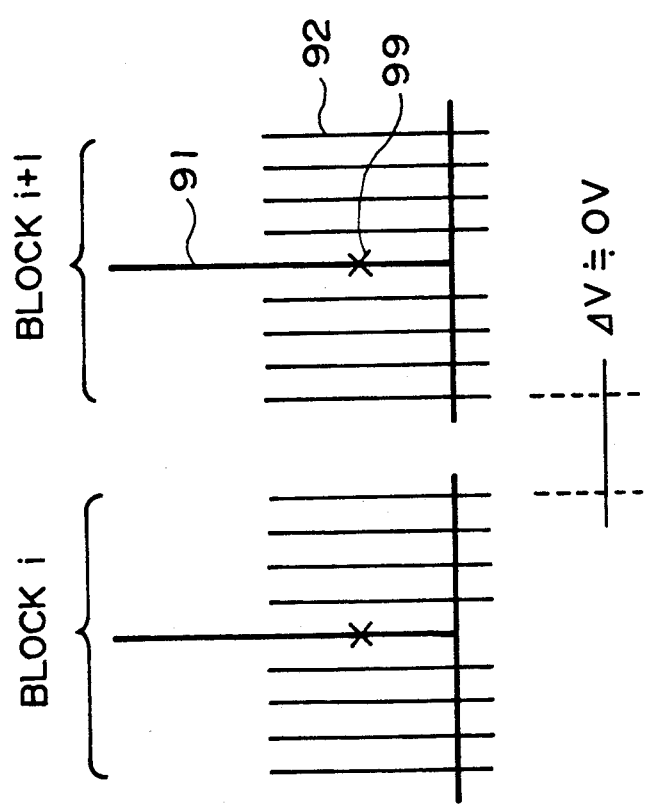
FIG. 7 illustrates a preferred arrangement of a gate line or switching line according to the present invention.

FIG. 7 is a plan view of such a preferred embodiment. Referring to FIG. 7, a gate line 91 for each block is led in so as to pass almost the center 98 (preferably within one tenth of the number of source lines (i.e., TFTs) from the center) of the block matrix and is branched into a reverse T and intersects with source lines 92 so as to distribute almost the same number (generally in the range of 40-60% of the total) on the left and right sides at respective intersections with the source lines. The gate pulse delay at this time becomes minimum at the center, and maximum at both ends. However, the absolute value of the maximum is reduced to nearly a half (involving 4 intersections and TFTs) compared with that for the leftmost TFT as in an arrangement shown in FIG. 8 (corresponding to 8 intersections and TFTs). Moreover, two TFTs at the boundary of blocks i and i+1 equally receive a delay time for 4 intersections and TFTs, so that no difference in charge efficiency (thus $\Delta V \approx 0$) or luminance occurs.

Moreover, the above arrangement does not accompany any increase in difficulty of mask designing or production process, so that the effect of improvement is very remarkable.

Figure 14:
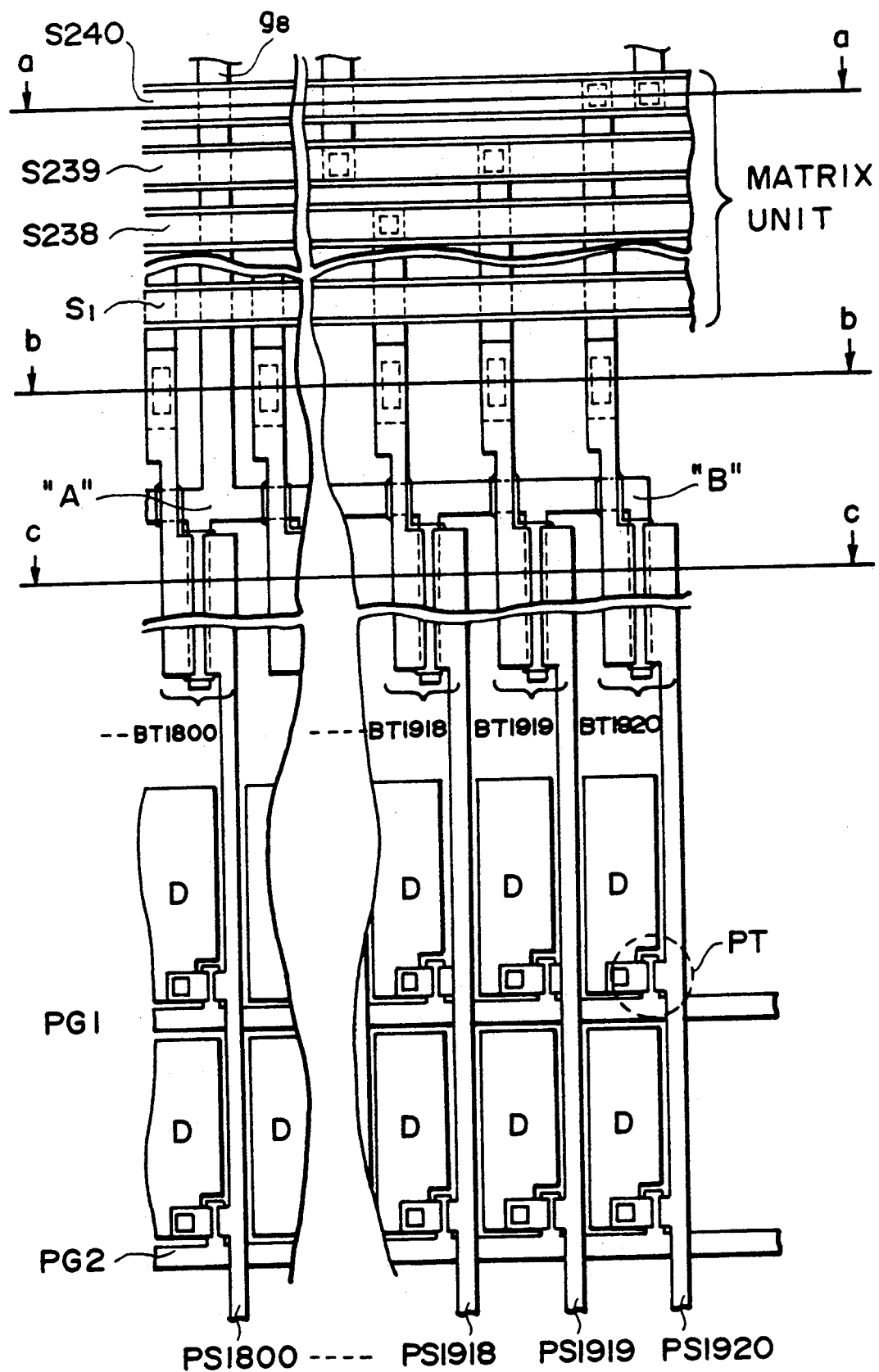
FIG. 14 is a plan view showing another wiring arrangement according to the present invention.

FIG. 14 is a partial plan view showing a more precise layout of a multiplexing TFT matrix for block division in combination with a part of a panel matrix, in which BT denotes a block or multiplexing TFT, PG denotes a panel gate, PS denotes a panel source, and PT denotes a panel or pixel TFT.

Figure 15A:
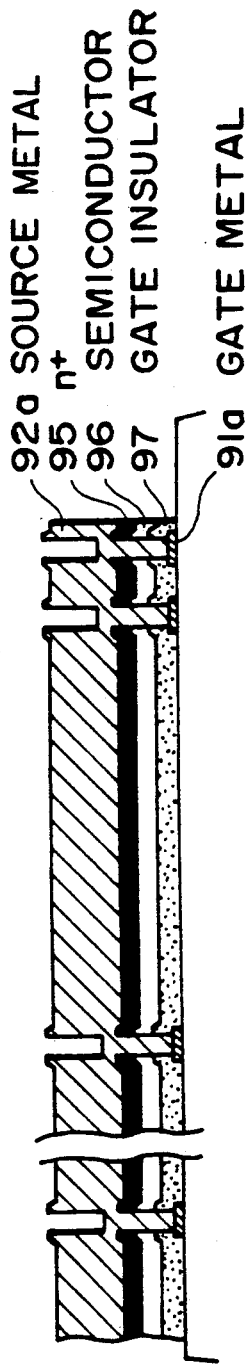
FIGS. 15A-15C show sections of three parts in FIG. 14.
Figure 15B:
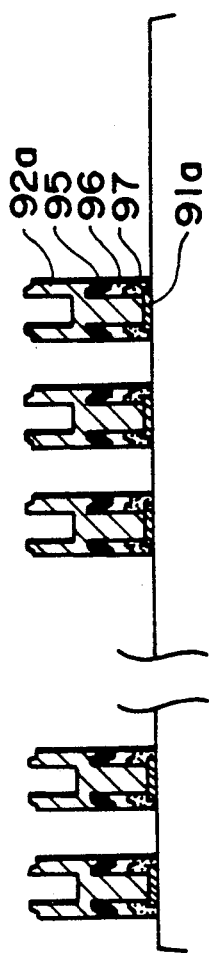
Figure 15C:
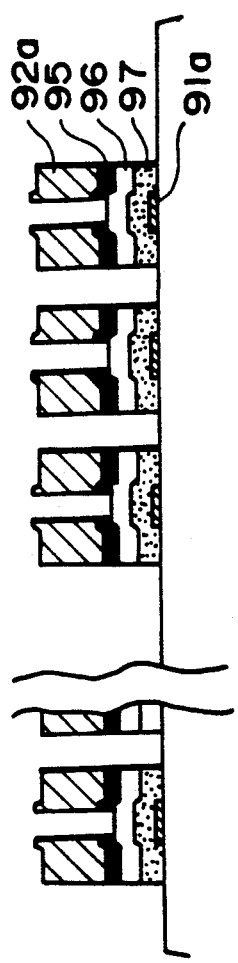

Referring to FIG. 14, a gate line $g_8$ for an eight block, for example, is introduced along a line passing through the center of the TFT array ($BT_{1680}$-$BT_{1920}$) in the block and branched at point "A" to form a reverse T. The layout apparently does not increase in difficulty as compared with an embodiment of FIG. 8 wherein the gate line is introduced through the left end (not shown) or the right end ("B"). In this instance, the arrangement of block TFTs may be arbitrary, but an arrangement wherein the source-drain channel of a TFT extends perpendicularly to the input-output lines for data (i.e., data lines (PS) for conveying image data in a case of FIG. 14 showing a display picture frame), is desirable in order to increase the arrangement density of the block TFTs. FIGS. 15A, 15B and 15C are sectional views taken along lines a—a, b—b and c—c, respectively, in FIG. 14.

The present invention may also be applicable to a display apparatus comprising a passive matrixtype ferroelectric liquid crystal device as disclosed in, e.g., U.S. Pat. No. 4,367,924, instead of an active matrix type liquid crystal device using switching elements disposed at respective pixels as described above. More specifically, the signal lines of such a ferroelectric liquid crystal device may be divided (or grouped) into blocks for using a smaller number of commonly connected source lines in the manner described above. In this instance, a ferroelectric liquid crystal in a chiral smectic phase, particularly C phase, H phase, J phase, K phase or G phase may suitably be used.

As described hereinabove, according to the present invention, the number of signal lines requiring connection with an external circuit can be significantly reduced (a number of signal lines: from 1920 lines to 240 or 248 lines and a signal line density: from 13.5 lines/mm to 1.69 lines/mm (87.5% decrease) to 1.75 lines/mm (87.0% decrease) in the above examples). Accordingly, many advantages are attained including simplification of manufacturing, increase in production yield, decrease in number of external signal-processing ICs, etc., which provide economical advantages as well as realization of reduction in scale size and cost of external signal each horizontal scanning period may be minimized.

Further, the above explanation of the present invention has been made with reference to an example using analog image signals, but the present invention may also be applicable to a device or apparatus using signal lines for other types of signals such as digital signals.

Further, according to the present invention, an improved signal output or supplying apparatus capable of supplying parallel signals from signal lines divided into plural blocks, with a uniform signal level and without a remarkable difference in signal level at a boundary of blocks, can be provided. By combining the signal supplying apparatus with a display device using parallel signals from the signal supplying apparatus, a display apparatus providing a good quality of display may be provided by preventing a difference in luminance at a boundary between neighboring blocks or display areas without increasing any difficulty in pattern designing or process designing.

What is claimed is:

1. A display apparatus, comprising:
    a plurality of pixels arranged in pluralities of rows and columns;
    a plurality of first control lines each connecting a column of pixels in common, said first control lines being divided into a plurality of blocks;
    a plurality of second control lines each connecting a row of pixels in common;
    third control lines each branched into a plurality of lead lines so that a corresponding one of said first control lines in each of the blocks are commonly connected by a respective one of said third control lines through a corresponding one of said plurality of lead lines; and
    a plurality of multiplexing switching elements, each of said plurality of multiplexing switching elements corresponding to a respective one of said first control lines, and said switching elements being disposed at each connection between said plurality of lead lines and said first control lines, and wherein said multiplexing switching elements are divided into the plurality of blocks;
    fourth control lines disposed so that said multiplexing switching elements in each of the blocks are commonly connected by a respective one of said fourth control lines, said fourth control lines supplying control signals to said multiplexing switching elements, wherein a substantially equal number of corresponding lead lines are disposed on each side of said respective one of said fourth control lines for each of the plurality of blocks, and
    wherein when similar control signals are applied to adjacent blocks as supplied by said fourth control lines, a difference in voltage between corresponding first control lines of two multiplexing switching elements for the adjacent blocks disposed at a boundary between a neighboring pair of blocks is at most 50 mV.

2. A display apparatus according to claim 1, wherein said difference in voltage between two multiplexing elements is 20 mV or less.

3. A display apparatus according to claim 1, wherein each of said plurality of blocks comprises the same number of intersections between the third control line commonly connecting a plurality of the multiplexing switching elements in the block and input lines each connected to one of the multiplexing switching elements.

4. A display apparatus according to claim 1, wherein said multiplexing switching element is a thin film transistor.

5. A display apparatus according to claim 1, wherein a liquid crystal is disposed at the pixels.

6. A display apparatus according to claim 5, wherein said liquid crystal is a ferroelectric liquid crystal.

7. A display apparatus according to claim 5, wherein said liquid crystal is a nematic liquid crystal.

8. A display apparatus comprising:
    a first substrate which has disposed therein a plurality of pixel switching elements arranged in plural rows and plural columns;
    first control lines each connecting a row of switching elements in common, said first control lines being divided into a plurality of blocks;
    second control lines each connecting a column of switching elements in common;
    pixel electrodes each connected to one of the switching elements;
    a second substrate which has a common electrode disposed opposite to the first substrate and a liquid crystal disposed between said first substrate and the second substrate,
    third control lines each branched into a plurality of lead lines so that a corresponding one of the first control lines in each of the blocks are commonly connected by a respective one of said third control lines through a corresponding one of said lead lines; and
    a plurality of multiplexing switching elements, each of said plurality of multiplexing switching elements corresponding to a respective one of said first control lines, and said switching elements being disposed at each connection between said plurality of lead lines and said first control lines, and wherein said multiplexing switching elements are divided into the plurality of blocks;
    fourth control lines disposed so that said multiplexing switching elements in each of the blocks are commonly connected by a respective one of said fourth control lines, said fourth control lines supplying control signals to said multiplexing switching elements, wherein a substantially equal number of corresponding lead lines are disposed on each side of said respective one of said fourth control lines for each of the plurality of blocks, and wherein when similar control signals are applied to adjacent blocks as supplied by said fourth control lines, a difference in voltage between corresponding first control lines of two multiplexing switching elements for the adjacent blocks disposed at a boundary between a neighboring pair of blocks is at most 50 mV.

9. A display apparatus according to claim 8, wherein said difference in voltage between two multiplexing elements is 20 mV or less.

10. A display apparatus according to claim 8, wherein each of said plurality of blocks comprises the same number of intersections between the third control line commonly connecting a plurality of the multiplexing switching elements in the block and input lines each connected to one of the multiplexing switching elements.

11. A signal supplying apparatus comprising:
a signal line driver circuit;
a plurality of signal lines responsive to said signal line driver circuit, wherein said signal lines are divided into a plurality of blocks;
first control lines each branched into a plurality of lead lines so that a corresponding one of said signal lines in each of the blocks are commonly connected by a respective one of said first control lines through a corresponding one of said plurality of lead lines; and a plurality of multiplexing switching elements, each one of said plurality of multiplexing switching elements corresponding to a respective one of said signal lines, and said switching elements being disposed at each connection between said plurality of lead lines and said signal lines, and wherein said multiplexing switching elements are divided into the plurality of blocks;

second control lines disposed so that said multiplexing switching elements in each of the blocks are commonly connected by a respective one of said second control lines, said second control lines supplying control signals to said multiplexing switching elements, wherein a substantially equal number of corresponding lead lines are disposed on each side of said respective one of said second control lines for each of the plurality of blocks, and;

wherein when similar control signals are applied to adjacent blocks as supplied by said second control lines, a ratio between voltages from any two signal lines of said adjacent blocks is within the range of 1±0.10, and a ratio between voltages from two signal lines of said adjacent blocks at a boundary between a neighboring pair of blocks is in the range of 1±0.01.

12. A signal supplying apparatus according to claim 11, wherein said ratio between voltages from any two signal lines is within the range of 1±0.05; and said ratio between voltages from two signal lines at a boundary between a neighboring pair of blocks is in the range of 1±0.003.

* * * * *